2,823,140

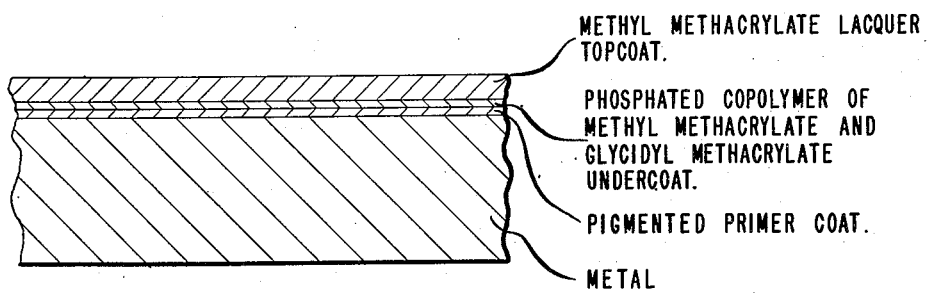

PROCESS OF COATING METAL WITH METHYL METHACRYLATE RESIN AND PRODUCT FORMED THEREBY

John H. Lowell, Brookline, Pa., assignor to E. I. du Pont de Nemours and Company, Wilmington, Del., a corporation of Delaware Application December 30, 1954, Serial No. 478,905

12 Claims. (Cl. 117—75)

This invention relates to multiple-layer finishing systems for metal, and more particularly to such systems comprising a pigmented primer in contact with the metal, an organic polymeric phosphate undercoat over said primer, and a pigmented methyl methacrylate lacquer topcoat over said undercoat.

The term "polymer of methyl methacrylate" and related terms, as used herein, means homopolymers of methyl methacrylate, copolymers of methyl methacrylate and other materials copolymerizable therewith containing a major proportion of methyl methacrylate, or mixtures of such homopolymers and/or copolymers.

The term "methyl methacrylate lacquer," "methyl methacrylate coating composition," and related terms as used herein for the sake of brevity, mean liquid coating compositions containing conventional pigments and solvents and, as the principal film-forming material, a polymer of methyl methacrylate. The methyl methacrylate lacquers may also contain conventional modifiers, such as plasticizers, inhibitors, dispersing agents, flow control agents and the like. When reference is made to a layer, or film, of methyl methacrylate lacquer the term signifies a dry layer obtained by applying one or more coatings of such liquid compositions to a suitable substrate and permitting or causing the coating to dry.

The term "primer," as used herein, means a liquid coating composition which is applied to the metal article being coated, or a dry layer thereof derived from one or more applications of the liquid composition.

The term "undercoat," as used herein, means a different liquid coating composition which is applied directly over the primer, or a dry layer thereof derived from one or more applications of the liquid composition.

The term "polymeric phosphate undercoat," as used herein, means a liquid undercoat comprising a polymeric phosphate reaction product of phosphoric acid with a copolymer of methyl methacrylate and glycidyl methacrylate, or a dry layer thereof derived from one or more applications of the liquid undercoat.

The term "topcoat," as used herein, means the last liquid coating composition which is applied to the metal article being coated, or a dry layer thereof derived from one or more applications of the liquid composition.

The term "finishing system," as used herein, means a multiple-layer coating of at least three different coating compositions comprising a primer, an undercoat, and a top layer in adherent contact therewith.

It is known that polymers of methyl methacrylate have excellent outdoor durability. In particular, pigmented lacquers containing methyl methacrylate polymers as the principal film-forming material have excellent gloss retention, i. e., the original high gloss is retained during long periods of outdoor exposure. However, such compositions do not inherently possess the high level of metal-protecting and rust-inhibiting properties required for painting metal which is to be used outdoors, e. g., steel automobile bodies. Therefore, in order to take advantage of the excellent durability of methyl methacrylate lacquers, the metal to be finished must first be primed with a metal-protecting and rust-inhibiting primer.

It has been found that the conventional metal primers which are commonly used under alkyd resin enamel, amino-aldehyde resin enamel or nitrocellulose lacquer topcoats are not suitable for use directly under methyl methacrylate lacquer topcoats. More specifically, the durability advantages of methyl methacrylate lacquer topcoats cannot be fully realized with these primers because of poor adhesion of the topcoat to the primer. This may be observed immediately after the topcoat is applied and dried, or it may develop after the coated article is placed in service. In some cases the adhesion is so poor that the topcoat will flake and fall off the article, although this is usually observed only after prolonged outdoor exposure. In other cases, the topcoat appears to adhere, but some or all of this can be peeled from the primer so easily that it does not remain intact during normal service.

The broad object of this invention is to provide an improved multiple-layer metal finishing system comprising a topcoat of a methyl methacrylate lacquer, whereby the adhesion of the topcoat is such that full advantage can be taken of the excellent durability of the methyl methacrylate lacquer during prolonged service outdoors.

A specific object of this invention is to provide a multiple-layer metal finishing system comprising a pigmented primer, an organic polymeric phosphate undercoat, and a methyl methacrylate lacquer top layer, i. e., a finishing system which differs from prior art finishing systems in that it possesses simultaneously the essential properties of excellent adhesion of the topcoat to the undercoat, and excellent durability of the multiple-coat finishing system during prolonged service outdoors.

A further object is to provide metal articles, particularly steel articles, having an adherent and durable multiple-layer protective coating comprising a methyl methacrylate top layer.

These objects are accomplished by providing a multiple-layer finishing system for metal consisting of a layer of pigmented primer in adherent contact with said metal, a layer of polymeric phosphate undercoat in adherent contact with said primer, and a topcoat layer of methyl methacrylate lacquer in adherent contact with said undercoat, said undercoat comprising organic film-forming material consisting essentially of a polymeric phosphate reaction product of phosphoric acid with a copolymer of methyl methacrylate and glycidyl methacrylate.

Thus, according to this invention, a solution to the problem of poor adhesion of a methyl methacrylate topcoat to primed metal has been found in applying directly over the primer, prior to application of the methyl methacrylate lacquer topcoat, a layer of a liquid undercoat composition comprising volatile organic solvent and organic film-forming material consisting essentially of a polymeric phosphate reaction product of phosphoric acid with a copolymer of methyl methacrylate and glycidyl methacrylate.

In the drawing there is illustrated an enlarged cross sectional view of a representative portion of a coated metal article of the invention.

In addition to providing the essential property of good adhesion of methyl methacrylate lacquer topcoats to primed metal articles, and thereby increasing the useful life of the finished articles, the polymeric phosphate undercoats used in this invention have the further particular advantages of (1) providing substantially crack-free finishing systems, (2) having better adhesion and better resistance to blistering than other undercoats which work satisfactorily under methyl methacrylate lacquer topcoats, such as certain undercoats containing nitrocellulose, and (3) having better outdoor durability in these finishing systems than other suitable undercoats, whereby the thickness of the more costly topcoats can be reduced to provide an economic advantage.

The polymeric phosphates employed in the undercoats of this invention are disclosed in the copending application of Martin E. Cupery, S. N. 345,233, filed March 27, 1953. This copending application describes in detail a large genus of polymeric phosphate reaction products of phosphoric acid with polymeric epoxide copolymers of a wide variety of ethylenically unsaturated epoxy monomers and acyclic ethylenically unsaturated epoxy-free monomers, such as copolymers of (1) allyl glycidyl ether or glycidyl methacrylate and (2) vinyl acetate, vinyl chloride, acrylonitrile, butyl methacrylate or methyl methacrylate. The polymeric methyl methacrylate/glycidyl methacrylate phosphates employed in the present invention are unique species in that they fulfill simultaneously the physical, chemical, and economic requirements of the present invention.

The following specific examples are provided to illustrate this invention, but its scope is not intended to be limited thereby. Unless otherwise specified the parts and percentages are by weight.

EXAMPLE 1

*Copolymer of methyl methacrylate and glycidyl methacrylate*

A copolymer containing 95 parts of methyl methacrylate and 5 parts of glycidyl methacrylate was prepared by placing the following charge in an autoclave equipped with a thermometer, an agitator and means for heating and cooling the contents:

| | Parts by weight |
|---|---|
| Methyl methacrylate monomer | 110.0 |
| Glycidyl methacrylate monomer | 5.9 |
| Acetone | 40.5 |
| Toluene | 17.4 |
| Benzoyl peroxide—97% strength | .774 |
| | 174.574 |

The atmosphere above the liquid was replaced with nitrogen and the autoclave was sealed. The charge was reacted at about 100° C. with agitation for about 2 hours and was then cooled. At about 80° C. it was thinned with 104 parts of toluene and 11.5 parts of acetone. It was finally cooled to room temperature.

The resulting solution contained 39.5% by weight of a 95/5 copolymer of methyl methacrylate and glycidyl methacrylate.

*Polymeric phosphate solution of copolymer*

A polymeric phosphate of the above-described copolymer was prepared by adding thereto, in the vented autoclave, 39 parts of toluene and a mixture of 60 parts of acetone and 4.65 parts of aqueous 85% orthophosphoric acid. The charge was agitated at room temperature for about an hour, at about 60° C. for an additional hour, and was finally cooled to room temperature.

The resulting solution contained 30.2% of a polymeric phosphate reaction product of phosphoric acid and the 95/5 methyl methacrylate/glycidyl methacrylate copolymer. In the reaction, 0.97 mol of phosphoric acid was used for each mol of glycidyl methacrylate.

Analyses of analogous polymeric phosphate reaction products indicate that unreacted phosphoric acid is present and that, in addition to phosphate ester groups formed in the polymer by reaction between phosphoric acid and epoxide oxygen (in the glycidyl radical), the polymeric material also contains a cyclic ketal-type product formed by an addition reaction between acetone and epoxide oxygen, whereby a glycidyl radical becomes an isopropylidene glyceryl radical.

*Pigmented polymeric phosphate undercoat*

A liquid undercoat of this invention was prepared as follows:

| First portion: | Parts by weight |
|---|---|
| Titanium dioxide pigment | 25.5 |
| Polymeric phosphate solution prepared above | 56.3 |
| Toluene | 72.7 |
| Second portion: | |
| Polymeric phosphate solution prepared above | 180.0 |
| Benzyl butyl phthalate plasticizer | 29.0 |
| | 363.5 |

The composition was prepared by grinding the ingredients of the first portion in conventional paint grinding equipment until a smooth uniform dispersion was obtained. Then the ingredients of the second portion were admixed therewith to produce a liquid undercoat composition.

EXAMPLE 2

*Copolymer of methyl methacrylate and glycidyl methacrylate*

A copolymer containing 87.5 parts of methyl methacrylate and 12.5 parts of glycidyl methacrylate was prepared by reacting the following charge in a vessel equipped with a thermometer, an agitator, a reflux condenser and means for heating and cooling the contents.

| First portion: | Parts by weight |
|---|---|
| Cumene | 1050 |
| Methyl isobutyl ketone | 2100 |
| Second portion: | |
| Methyl methacrylate monomer | 2100 |
| Glycidyl methacrylate monomer | 300 |
| Methyl isobutyl ketone | 1050 |
| Cumene hydroperoxide (74.2%) | 68 |
| | 6668 |

The first portion was placed in the reaction vessel and was heated to reflux temperature, about 120° C. Then the second portion, in the form of a homogeneous mixture, was added dropwise while maintaining the charge in the reaction vessel at the reflux temperature, 112°–120° C. This required about 2 hours. The charge was then heated at about 112°–115° C. for an additional period of about 4 hours, when the copolymerization was considered complete. The cumene was removed by adding 1050 parts of methyl isobutyl ketone and 264 parts of water and distilling at 35°–45° C. until no more water appeared in the distillate.

The resulting solution contained 38.7% by weight of an 87.5/12.5 copolymer of methyl methacrylate and glycidyl methacrylate.

*Polmeric phosphate solution of copolymer*

A polymeric phosphate of the above-described copolymer was prepared by adding thereto a mixture of 242 parts of aqueous 85% phosphoric acid and 1800 parts of methyl ethyl ketone. The charge was agitated at room temperature for about an hour, at about 60° C. for an additional hour, and was finally cooled to room temperature.

The resulting solution contained 31% of a polymeric phosphate reaction product of phosphoric acid and the 87.5/12.5 methyl methacrylate/glycidyl methacrylate copolymer. In the reaction, 1 mol of phosphoric acid was used for each mol of glycidyl methacrylate.

*Pigmented polymeric phosphate undercoat*

A liquid undercoat of this invention was prepared as in Example 1, except that all of the ingredients were subjected to grinding and the proportions were as follows:

| | Parts by weight |
|---|---|
| Titanium dioxide pigment | 25 |
| Polymeric phosphate solution prepared above | 228 |
| Benzyl butyl phthalate plasticizer | 29 |
| | 282 |

EXAMPLE 3

A polymeric phosphate of a 98/2 methyl methacrylate/glycidyl methacrylate copolymer was prepared in accordance with the description of this invention, and a solution of it without plasticizer or pigment was retained for use as an undercoat. In the phosphation step, one mol of phosphoric acid was used for each mol of glycidyl methacrylate.

EXAMPLE 4

A pigmented undercoat of this invention was prepared by the procedure of Example 1 except that 0.8 mol of phosphoric acid per mol of glycidyl methacrylate was substituted for the 0.97 mol of phosphoric acid employed in that example.

EXAMPLE 5

A pigmented undercoat of this invention was prepared by the procedure of Example 1 except that 2.5 mols of phosphoric acid per mol of glycidyl methacrylate were substituted for the 0.97 mol of phosphoric acid employed in that example.

EXAMPLE 6

A pigmented undercoat of this invention was prepared by the procedure of Example 1, except that an anti-sagging, anti-crazing ingredient, "Bentone" 34, was added in the preparation of the pigmented polymeric phosphate undercoat, in accordance with the following formula:

|  | Parts by weight |
|---|---|
| First portion: | |
| Titanium dioxide pigment | 25.5 |
| Dimethyl dioctadecyl ammonium bentonite ("Bentone" 34, National Lead Company) | 6.0 |
| Polymeric phosphate solution of Example 1 | 56.3 |
| Toluene | 72.7 |
| Second portion: | |
| Polymeric phosphate solution of Example 1 | 180.0 |
| Benzyl butyl phthalate plasticizer | 29.0 |
|  | 369.5 |

Finishing systems of this invention comprising the polymeric phosphate undercoats of Examples 1–5, and finishing systems containing no undercoats, were prepared in the following general manner for subsequent testing. Clean auto body steel panels, some of which were treated with a rustproofing composition, such as "Bonderite," were first coated with a variety of widely accepted types of commercial metal primers. The lower half of each primed panel was then undercoated with one of the undercoats of Examples 1–5 so that each of the undercoats was applied over one or more of the conventional primers. Then a methyl methacrylate lacquer topcoat was applied over the whole area of each of the panels. Thus the upper half of each panel represented a prior art primer with a methyl methacrylate topcoat (topcoat directly over primer) and the lower half represented a finishing system of this invention (topcoat over undercoat over primer).

A more detailed description of the manner in which these finishing systems were prepared is as follows:

Each finishing system was applied to a set of two identical test panels.

The conventional primers all contained suitable amounts of commonly-used undercoat pigments. Their organic film-forming constituents were as follows, on a non-volatile solids basis:

|  | Parts by weight |
|---|---|
| Primer A: | |
| 55% linseed oil modified glyceryl phthalate alkyd resin | 59.3 |
| 50% linseed oil modified phenol-formaldehyde resin varnish | 40.7 |
|  | 100.0 |
| Primer B: | |
| 43% soya oil modified glycerol phthalate alkyd resin | 12.1 |
| 24% linseed oil, 24% chinawood oil modified glycerol phthalate alkyd resin | 75.8 |
| 50% linseed oil modified phenol-formaldehyde resin varnish | 1.1 |
| Butylated urea-formaldehyde resin | 11.0 |
|  | 100.0 |
| Primer C: | |
| 43% soya oil modified glycerol phthalate alkyd resin | 11.2 |
| 35% soya oil modified glycerol phthalate alkyd resin | 68.4 |
| Butylated urea-formaldehyde resin | 20.4 |
|  | 100.0 |
| Primer D: | |
| 43% soya oil modified glycerol phthalate alkyd resin | 100.0 |
| Primer E: | |
| 65% linseed oil modified ester gum varnish | 86.8 |
| Bodied linseed oil | 13.2 |
|  | 100.0 |

The primers were sprayed on the panels in sufficient amount to produce dry coatings about 0.5 mil thick. Due to their different drying characteristics, the wet primed panels were baked at different temperatures for different lengths of time as follows, to produce the proper degree of cure or hardness:

|  | Baking conditions |
|---|---|
| Primer A | 30 minutes at 250° F. |
| Primer B | 45 minutes at 275° F. |
| Primer C | 45 minutes at 275° F. |
| Primer D | 30 minutes at 180° F. |
| Primer E | 30 minutes at 250° F. |

The primed panels were cooled to room temperature and the bottom half of each was sprayed with one of the undercoats of Examples 1–5, thinned to suitable spraying viscosity if necessary, in an amount sufficient to produce a dry coating of undercoat about 0.4 mil thick, each undercoat having been used on at least one set of test panels. The undercoats were air dried for about 5 minutes, although the topcoat could have been applied either sooner or later if desired.

Finally, the whole area of each of the panels was sprayed with a methyl methacrylate topcoat lacquer, which had been thinned to suitable spraying viscosity, in sufficient amount to produce dry layers of topcoat about 1.5 mils thick. The wet topcoated panels were baked for 20 minutes at 180° F. to speed up the drying, which would require 16–24 hours at room temperature, whereby dry hard coatings were produced. The methyl methacrylate lacquer had the following composition:

|  | Parts by weight |
|---|---|
| Homopolymer of methyl methacrylate | 19.92 |
| 98/2 copolymer of methyl methacrylate and methacrylic acid | 4.91 |
| Benzyl butyl phthalate | 10.20 |
| Titanium dioxide | 9.85 |
| Toluol | 36.57 |
| Acetone | 11.17 |
| Xylol | 7.38 |
|  | 100.00 |

The homopolymer and copolymer of methyl methacrylate employed in this composition had relative viscosities of about 1.173 and 1.157, respectively. Relative viscosity is the value of the fraction (A)    Efflux time of polymer solution
———————————————————
(B)    Efflux time of solvent used in polymer solution The efflux times were measured in accordance with the procedure of A. S. T. M. D-445-46T Method B, using as the "oil" mentioned in said procedure, (A) a solution of 0.25 gram of the methyl methacrylate polymer in 50 cc. of ethylene dichloride, and (B) a sample of the ethylene dichloride used in making said solution, respectively. The determinations were run at 25° C. in a modified Ostwald viscosimeter, series 50.

The methyl methacrylate lacquer was prepared by grinding the pigment in a solution of the copolymer until a smooth uniform dispersion was obtained and subsequently adding to the resulting dispersion a solution of the homopolymer.

The thus coated panels had acceptable properties with respect to appearance, gloss and hardness; and no differences were readily apparent between the areas using the prior art primer but no polymeric phosphate undercoat and the areas having a finishing system of this invention.

The top (not undercoated) and bottom (undercoated) halves of each panel were tested for the critical property of top layer adhesion by cutting two 2" marks in the form of an X vertically through the coating down to the metal, securely pressing a strip of pressure-sensitive cellophane adhesive tape over the X, and pulling it off with a jerk, whereby varying amounts of the finishing system were removed and it could be observed how well each layer adhered to the layer therebeneath.

In each case it was determined that the methyl methacrylate lacquer topcoat adhered poorly to the primer and was rather easily stripped off cleanly. In contrast, the topcoat adhered well to the undercoat, as evidenced by the fact that the adhesive tape either came off without any attached portions of the finishing system or, if portions were peeled off, it appeared that adhesion had failed in a random manner at the various interfaces of the finishing system.

These test results confirmed the analogous observation that freshly prepared methyl methacrylate finishing systems containing a polymeric phosphate undercoat would withstand more handling and abuse without failure by loss of adhesion than would similar finishing systems not containing the polymeric phosphate undercoat.

These test results on freshly prepared finishing systems were further substantiated when duplicate panels were exposed outdoors in Florida for eight months or longer. During this period all of the areas where the methyl methacrylate lacquer topcoat had been applied directly to the primer failed by loss of topcoat adhesion, some so badly that a light rubbing or brushing or a strong air current would remove the topcoat. In all cases, the topcoat remained adherent where it had been applied over a polymeric phosphate undercoat in accordance with this invention.

Although a particular methyl methacrylate lacquer topcoat was used in the above tests, similar differences in results were obtained when other methyl methacrylate topcoat lacquers were used in testing finishing systems containing a polymeric phosphate undercoat in comparison with finishing systems not containing a polymeric phosphate undercoat.

The above-described results make it obvious that the finishing systems of this invention are far more serviceable than those using prior art primers without the undercoats of this invention, both initially and during prolonged service outdoors, as is the case with automobile bodies, for instance.

The methyl methacrylate and glycidyl methacrylate monomers employed in the preparation of the polymeric phosphates used in this invention may be copolymerized by well-known processes other than those specifically described in the examples, for instance by using other free radical catalysts than benzoyl peroxide and cumene hydroperoxide, such as alpha, alpha'-azodiisobutyronitrile. Minor amount of other polymerizable monomers, such as other acrylic esters, may be included in the copolymers. The monomers may be used in their commercially available forms, i. e., containing a few parts per million of inhibitor, or they may be further purified be removing the inhibitor.

While various weight ratios of methyl methacrylate:glycidyl methacrylate may be used in making the copolymers, a preferred weight ratio is between 85:15 and 99:1. A still further preferred range is between 90:10 and 98:2, and a specifically preferred copolymer is 95:5 methyl methacrylate:glycidyl methacrylate.

The process of converting the copolymers to the corresponding polymeric phosphates is preferably carried out in a solution containing a substantial amount of a ketone, such as acetone, methyl ethyl ketone or methyl isobutyl ketone, although a straight hydrocarbon solution may be used. The phosphation step may be carried out with moderate agitation at room temperature, but heating as indicated in the examples shortens the process. Although orthophosphoric acid, $H_3PO_4$, is the preferred phosphating agent, other acids of phosphorus such as meta- or pyrophosphoric acids may be used. Likewise, partial esters of phosphorus acids, such as methyl or butyl acid phosphate, may be used. Although the preferred amount of orthophosphoric acid or equivalent is about one mol per mol of glycidyl methacrylate, suitable products may also be made by using 0.8 to 2.5 mols per mol of glycidyl methacrylate.

The preferred polymeric phosphate undercoats of this invention contain an above-described polymeric phosphate or a mixture of two or more such materials as the sole organic film-forming material, except for plasticizer when desired. However, certain polymers of methyl methacrylate, particularly homopolymers like the one used in the previously described topcoat, are compatible with the polymeric phosphate solutions and may be incorporated therein, if desired, in relatively high proportions. For instance, an undercoat of this invention which is equivalent to the product of Example 1 (polymeric phosphate of a 95/5 methyl methacrylate/glycidyl methacrylate copolymer) may be prepared from a mixture of equal parts of (1) a homopolymer of methyl methacrylate and (2) a polymeric phosphate of a 90/10 methyl methacrylate/glycidyl methacrylate copolymer.

The preferred undercoats of this invention contain a plasticizer in any suitable amount, e. g., 10%–50% by weight of the polymeric phosphate. When a plasticizer is required or desired, it is preferred to use the same kind as is to be used in the methyl methacrylate lacquer topcoat. Suitable plasticizers are, for instance, benzyl butyl phthalate, dibutyl phthalate, triphenyl phosphate, 2-ethyl hexyl benzyl phthalate and dicyclohexyl phthalate. Other well-known plasticizers which may be employed include diallyl phthalate, dibenzyl phthalate, butyl cyclohexyl phthalate, mixed benzoic acid and fatty oil acid esters of pentaerythritol, poly (propylene adipate) dibenzoate, diethylene glycol dibenzoate, tetrabutylthiodisuccinate, butyl phthalyl butyl glycolate, acetyl tributyl citrate, dibenzyl sebacate, tricresyl phosphate, toluene ethyl sulfonamide, the di 2-ethyl hexyl ester of hexamethylene diphthalate, and di(methylcyclohexyl) phthalate.

Other solvents, solvent mixtures, or solvent-diluent mixtures which are commonly used in the organic coating art may be used in the undercoats of this invention. Such solvents and diluents include esters such as ethyl acetate, butyl acetate or ethylene glycol monoethyl ether acetate, ketones such as acetone, methyl ethyl ketone or methyl isobutyl ketone, alcohols such as ethyl or isopropyl alcohol, ethers such as ethylene glycol monobutyl ether, and hydrocarbons such as toluene, xylene or naphtha.

Although the clear, unpigmented undercoats of this invention are useful, the preferred undercoats contain pigment in any desired amount. The most useful products contain 10%–50% of pigment by weight based on the total weight of organic film-forming material. For the sake of brevity and simplicity, only one pigment was used in the examples, i. e., titanium dioxide white, to provide a white undercoat for the methyl methacrylate lacquer disclosed, which was also white. Generally, it is convenient to use an undercoat having a color similar to the topcoat. Thus, if a red topcoat had been used to illustrate the invention, red undercoats would have been preferred, in which case the undercoat examples would have used a red pigment in place of or in addition to the titanium dioxide. Examples of other pigments which may be used in the undercoats of this invention include iron oxide, zinc chromate, carbon black, phthalocyanine blue or green, barytes, whiting, talc, china clay and other pigments, or mixtures thereof, which are commonly employed in the organic coating art. Since the polymeric phosphate film-forming materials tend to be acidic, pigments which are acid-sensitive should be avoided when absolute color uniformity is required.

A useful ingredient in the undercoats of this invention to improve the sagging of relatively thick wet coats during application and to improve crazing resistance when the dry undercoat is subsequently topcoated is 1–50%, based on the weight of the non-volatile components of an organophilic cation-modified clay, such as bentonite or montmorillonite, modified with an onium radical of the class consisting of ammonium, phosphonium, oxonium, sulfonium, arsonium, stibonium and telluronium having at least one alkyl substituent containing at least 10 carbon atoms in a straight chain. An example is the dimethyl dioctadecyl ammonium bentonite used in Example 6. Other modified clays of this class may be substituted for this particular modified clay.

The coating compositions employed in this invention may be applied by any convenient method, such as spraying, dipping or brushing, although spraying is preferred. The thickness of the individual coatings so applied is not critical, provided the normal limits employed in the organic coating art, e. g., 0.2–2.0 mils per coat, are observed.

Metal primers are produced in air-drying or baking modifications; and, since the method of drying is not critical, both types are included in this invention.

The preferred and most convenient method of drying the undercoats of this invention is by air-drying, i. e., evaporation of the volatile components at room temperature, which requires only a few minutes. However, the undercoats may be force-dried or baked, if desired, by exposing the undercoated article to an elevated temperature, e. g., 150–200° F., for 5–20 minutes.

It is to be understood that the methyl methacrylate lacquer employed as a topcoat in the foregoing description of this invention is merely representative of a wide variety of such lacquers which may be used in the improved finishing systems of this invention. All of the constituents of said lacquer may be varied in kind and/or proportion by means known in the art. A typical homopolymer and a typical copolymer of methyl methacrylate are specifically disclosed. Suitable copolymers include copolymers of methyl methacrylate with a minor proportion, e. g., 2–25% of another material copolymerizable therewith, for instance, acrylic acid, methacrylic acid, the $C_1$–$C_4$ alkyl esters of acrylic acid, the $C_2$–$C_4$ alkyl esters of methacrylic acid, vinyl acetate, acrylonitrile, and styrene. A preferred copolymer contains about 98% of methyl methacrylate and 2% of methacrylic acid.

The preferred polymers for use in the methyl methacrylate topcoat lacquers have a relative viscosity between 1.117 and 1.196, as measured by the previously defined method. Topcoat lacquers based on such polymers are disclosed and claimed in a copending application, Serial No. 434,661, filed June 14, 1954, by Laverne W. Crissey and John H. Lowell. Still other topcoat lacquers, which are particularly adapted to convenient spray application, are disclosed and claimed in copending application Serial No. 402,498, filed January 6, 1954, by Laverne W. Crissey and John H. Lowell.

The preferred finishing systems of this invention consist of a primer layer in contact with a metal substrate, a polymeric phosphate undercoat layer as previously described in contact with the primer, and a methyl methacrylate lacquer top layer in contact with the undercoat layer. However, obvious variations will be apparent to those skilled in the coating art. For instance, the primer layer may consist of two or more coats of two or more different priming compositions, followed in sequence by a polymeric phosphate undercoat and a methyl methacrylate lacquer topcoat.

The finishing sysems of this invention are useful in obtaining suitable adhesion of methyl methacrylate lacquer topcoats to those primed metal articles to which they do not adhere well when the topcoat is in direct contact with the primer. This improvement is obtained without sacrificing other essential properties. Thus, the invention primarily provides a means of fully utilizing the excellent outdoor durability of methyl methacrylate lacquers, which heretofore has not been possible because of poor adhesion to widely used types of primers.

It is apparent that many widely different embodiments of this invention can be made without departing from the spirit and scope thereof; and, therefore, it is not intended to be limited except as indicated in the appended claims.

I claim:

1. A metal article having a hard, adherent, multiple-layer coating consisting of a layer of pigmented primer in adherent contact with said metal, a layer of undercoat in adherent contact with said primer, and a topcoat layer of methyl methacrylate lacquer in adherent contact with said undercoat, said undercoat comprising organic film-forming material consisting essentially of a polymeric phosphate reaction product of phosphoric acid with a copolymer of methyl methacrylate and glycidyl methacrylate.

2. The product of claim 1, in which the weight ratio of methyl methacrylate:glycidyl methacrylate in said copolymer is between 85:15 and 99:1.

3. The product of claim 1, in which the weight ratio of methyl methacrylate:glycidyl methacrylate in said copolymer is between 90:10 and 98:2.

4. The product of claim 1, in which the weight ratio of methyl methacrylate:glycidyl methacrylate in said copolymer is substantially 95:5.

5. The product of claim 1, in which said polymeric phosphate is a reaction product of said copolymer with 0.8 to 2.5 mols of phosphoric acid per mol of glycidyl methacrylate in said copolymer.

6. The product of claim 1, in which said polymeric phosphate is a reaction product of said copolymer with about 1 mol of phosphoric acid per mol of glycidyl methacrylate in said copolymer.

7. The product of claim 1, in which the undercoat contains pigment.

8. The product of claim 1, in which the undercoat contains plasticizer.

9. The product of claim 1, in which the undercoat contains organophilic cation-modified clay, said cation being an onium radical of the class consisting of ammonium, phosphonium, oxonium, sulfonium, arsonium, stibonium and telluronium having at least one alkyl substituent containing at least 10 carbon atoms in a straight chain.

10. The product of claim 1, in which the undercoat contains dimethyl dioctadecyl ammonium bentonite.

11. The process of improving the adhesion of a methyl methacrylate lacquer topcoat to a primed metal article, which comprises applying to said primed metal article a liquid undercoat composition before applying said methyl methacrylate lacquer, said liquid undercoat composition comprising volatile organic solvent and organic film-forming material consisting essentially of a polymeric phosphate reaction product of phosphoric acid with a copolymer of methyl methacrylate and glycidyl methacrylate.

12. The product of claim 1 in which the methyl methacrylate polymer component of the methyl methacrylate lacquer has a relative viscosity in the range of 1.117–1.196.

No references cited.

U. S. DEPARTMENT OF COMMERCE
PATENT OFFICE

CERTIFICATE OF CORRECTION

Patent No. 2,823,140                                February 11, 1958

John H. Lowell

It is hereby certified that error appears in the printed specification of the above numbered patent requiring correction and that the said Letters Patent should read as corrected below.

Column 4, line 51, for "Polmeric" read -- Polymeric --; column 6, line 62, for "Bnezyl" read -- Benzyl --; column 8, line 1, for "amount" read -- amounts --; line 44, for "arcylate" read -- acrylate --; column 10, line 18, for "sysems" read -- systems --.

Signed and sealed this 15th day of April 1958.

(SEAL)

Attest:

KARL H. AXLINE
Attesting Officer

ROBERT C. WATSON
Commissioner of Patents